(12) United States Patent
Kaatz et al.

(10) Patent No.: US 12,715,709 B2
(45) Date of Patent: Aug. 25, 2026

(54) METHOD FOR REGULATING A VELOCITY OF A CONVEYOR BELT OF A CONTAINER TREATMENT MACHINE AND DEVICE FOR CARRYING OUT THE METHOD

(71) Applicant: Krones AG, Neutraubling (DE)

(72) Inventors: Stefan Kaatz, Fleckeby (DE); Jesse Schmuck, Flensburg (DE)

(73) Assignee: KRONES AG, Neutraubling (DE)

( * ) Notice: Subject to any disclaimer, the term of this patent is extended or adjusted under 35 U.S.C. 154(b) by 31 days.

(21) Appl. No.: 18/734,741

(22) Filed: Jun. 5, 2024

(65) Prior Publication Data

US 2024/0409322 A1 Dec. 12, 2024

(30) Foreign Application Priority Data

Jun. 6, 2023 (DE) ..................... 10 2023 114 814.1

(51) Int. Cl.
*B65G 43/08* (2006.01)
*A23B 2/22* (2025.01)

(52) U.S. Cl.
CPC ................ *B65G 43/08* (2013.01); *A23B 2/22* (2025.01); *B65G 2203/0291* (2013.01)

(58) Field of Classification Search
CPC .... B65G 2203/0291; B65G 43/08; A23B 2/22
USPC .......................................................... 198/341
See application file for complete search history.

(56) References Cited

U.S. PATENT DOCUMENTS

| | | | | |
|---|---|---|---|---|
| 7,086,520 | B2 | 8/2006 | Monte | |
| 7,666,249 | B2 * | 2/2010 | Bleifuss | C21B 11/08 75/484 |
| 9,095,638 | B2 * | 8/2015 | Solfa | A23B 2/22 |
| 10,645,959 | B2 * | 5/2020 | Demoulin | A23B 2/003 |
| 12,185,745 | B2 * | 1/2025 | Concin | C02F 9/00 |
| 2024/0407401 | A1 * | 12/2024 | Kaatz | A23B 2/003 |
| 2024/0409322 | A1 * | 12/2024 | Kaatz | B67C 3/02 |
| 2025/0026624 | A1 * | 1/2025 | Clausen | B67C 7/002 |

FOREIGN PATENT DOCUMENTS

| | | | |
|---|---|---|---|
| DE | 602005001146 | T2 | 8/2007 |
| DE | 102013226080 | A1 | 6/2015 |
| DE | 102021130468 | A1 | 5/2023 |
| EP | 3753414 | * | 12/2020 |

(Continued)

OTHER PUBLICATIONS

European Patent Office, Extended European Search Report Issued in Application No. 24156028.3, Aug. 9, 2024, Germany, 16 pages.

*Primary Examiner* — Lester Rushin, III

(74) *Attorney, Agent, or Firm* — McCoy Russell LLP

(57) ABSTRACT

The disclosure relates to a method for regulating a velocity of a conveyor belt of a container treatment machine, such as a pasteurizer, in a filling line having a plurality of machines, wherein the method comprises: monitoring a current output of the filling line; when it is determined that the current output falls below a predefined nominal output, operating the conveyor belt at an effective velocity by a timed operation of the conveyor belt at a nominal velocity for a first time period and with stoppage of the conveyor belt for a second time period. The disclosure further relates to a device for carrying out the method, wherein the device comprises a container treatment machine with a conveyor belt.

17 Claims, 4 Drawing Sheets

(56) References Cited

FOREIGN PATENT DOCUMENTS

| | | | |
|---|---|---|---|
| IT | TO20120751 | * | 3/2014 |
| WO | WO2019106092 | * | 6/2019 |
| WO | 2023089170 A1 | | 5/2023 |
| WO | 2023089172 A1 | | 5/2023 |

* cited by examiner 1
v [m/s]
v_Nenn
0
t [s]

2
v [m/s]
v_Nenn
0
t [s]
3
4
90%
5

METHOD FOR REGULATING A VELOCITY OF A CONVEYOR BELT OF A CONTAINER TREATMENT MACHINE AND DEVICE FOR CARRYING OUT THE METHOD

CROSS REFERENCE TO RELATED APPLICATION

The present application claims priority to German Patent Application No. 10 2023 114 814.1 filed on Jun. 6, 2023. The entire contents of the above-listed application are hereby incorporated by reference for all purposes.

TECHNICAL FIELD

The disclosure relates to a method for regulating a velocity of a conveyor belt of a container treatment machine and to a device for carrying out the method.

BACKGROUND

It is known to adjust the belt velocity when the output is changed in a line for a constant pasteurization result (=PUs). For example, the pasteurizer can be temporarily stopped if there is a lack of containers at the inlet or a back-up of containers at the outlet downstream of the pasteurizer. In the case of permanently reduced output due to a series of disturbances on a machine downstream of the line or due to a reduced output at the filler caused by intervention into the filling process, this leads to a stop-and-go operation on the pasteurizer. The actual stop-and-go behavior can substantially be determined by the positioning of jam switches on the transport systems in the line, the available buffer, and the set dynamics of acceleration and deceleration of the machines upstream and downstream of the pasteurizer. A complex interaction of all machines is to be observed here.

SUMMARY

The operation of the pasteurizer in stop-and-go operation can, in the machines with a PU regulation, lead to cooling and heating of the machine, i.e., to an additional consumption of energy. The cause of this can be the intervention in the temperatures of the pasteurization zones with the aim of limiting the pasteurization result despite the standstill. In fact, however, the pasteurization result may inevitably deteriorate upward (more PUs than in uninterrupted throughput). In addition, the time in the pasteurization zones might increase, which can lead to pasteurization at lower temperatures and may be viewed critically from a microbiological standpoint with respect to the effective heating and pasteurization of the product.

Object

The object of the disclosure is to provide a method for regulating a velocity of a conveyor belt of a container treatment machine and to provide a device for carrying out the method, which are energy-efficient and can allow maintaining a predefined container treatment.

Achievement

The object is achieved by the method for regulating a velocity of a conveyor belt of a container treatment machine and the device for carrying out the method as disclosed herein.

The method according to the disclosure for regulating a velocity of a conveyor belt of a container treatment machine, such as a pasteurizer, in a filling line having a plurality of machines, comprises monitoring a current output of the filling line and, when it is determined that the current output falls below a predefined nominal output, operating the conveyor belt at an effective velocity by timed operation of the conveyor belt at a nominal velocity for a first time period, and with stoppage of the conveyor belt for a second time period.

The effective velocity is lower than the nominal velocity and greater than zero.

For operating the conveyor belt at the effective velocity, the cycle time can be changed or adapted by setting the first time period and/or the second time period.

Temperatures of treatment media in the container treatment machine can change due to the effective velocity at a current output of the filling line that falls below a predefined nominal output. For example, the pasteurization temperatures can change in a pasteurizer.

In the container treatment machine, it can be provided to carry out a treatment of containers when the conveyor belt is operated at the nominal velocity, and no treatment of containers when the conveyor belt is stopped. A treatment can mean an active treatment which, for example, can comprise application of treatment medium to the containers.

Operating at the effective velocity can mean the described timed operation. Thus, a temporally fixed change between operation of the conveyor belt at the nominal velocity and with stoppage of the conveyor belt.

By operating the container treatment machine at the effective velocity, energy can be saved, because active heating and/or cooling of treatment medium of the container treatment machine can be dispensed with.

The first time period may be equal to a first minimum time period or longer than the first minimum time period. The first minimum time period can result from physical specifications and/or conditions which can arise, for example, for starting at the nominal velocity from a stoppage of the conveyor belt. The first minimum time period may be 5 seconds, 10 seconds or 15 seconds.

The second time period may be equal to a second minimum time period or longer than the second minimum time period. The second minimum time period can result from physical specifications and/or conditions which can arise, for example, for a stoppage of the conveyor belt from the nominal velocity. The second minimum time period may be 5 seconds, 10 seconds or 15 seconds.

In order to achieve a desired effective velocity, the second time period may initially always be set equal to the second minimum time period. The time period of the stoppage of the conveyor belt may thus be as short as possible. And the first time period may be greater than the first minimum time period. The time period in which the conveyor belt is operated at nominal velocity can thus be as long as possible.

If the first minimum time period and the second minimum time period are equal, an effective velocity of 50% of the nominal velocity can be achieved during timed operation of the conveyor belt at the nominal velocity for the first minimum time period and with stoppage of the conveyor belt for the second minimum time period. For a smaller effective velocity, i.e., less than 50% of the nominal velocity, the first minimum time period may be maintained during timed operation of the conveyor belt at the nominal velocity and the second time period may be increased for the standstill of the conveyor belt.

If the first minimum time period is four times as long as the second minimum time period, an effective velocity of 75% of the nominal velocity may be achieved during timed operation of the conveyor belt at the nominal velocity for the first minimum time period and with stoppage of the conveyor belt for the second minimum time period. For a smaller effective velocity, i.e., less than 75% of the nominal velocity, the first minimum time period may be maintained during timed operation of the conveyor belt at the nominal velocity, and the second time period may be increased for the standstill of the conveyor belt.

The first time period and/or the second time period may be equal to or more than 5 seconds, equal to or more than 10 seconds, or equal to or more than 15 seconds. For example, the nominal velocity may be 2 meters per second.

The method may further comprise lowering a temperature in at least one treatment zone which is comprised by the container treatment machine, wherein the at least one treatment zone may be a first and/or a last treatment zone. For example, the temperature may be lowered by supplying treatment medium into the at least one treatment zone.

In addition or alternatively, a temperature may be lowered based on the effective velocity in at least one treatment zone which is comprised by the container treatment machine. The lowering of the temperature is thus not based directly on the change between nominal velocity and standstill of the conveyor belt, but on the effective velocity resulting from the cycle timing.

During timed operation of the conveyor belt at the nominal velocity for the first minimum time period and with stoppage of the conveyor belt for the second minimum time period, if the first minimum time period and the second minimum time period are equally long, an effective velocity of 50% of the nominal velocity may be achieved.

During timed operation of the conveyor belt at the nominal velocity for the first minimum time period and with stoppage of the conveyor belt for the second minimum time period, if the first minimum time period is four times as long as the second minimum time period, an effective velocity of 75% of the nominal velocity may be achieved.

Furthermore, a device for carrying out the method as described above or further below is provided, wherein the device comprises a container treatment machine with a conveyor belt. The container treatment machine may be a pasteurizer which is arranged, for example, in a filling line having a plurality of machines. A sensor system and/or regulating device for monitoring a current output of the filling line may be comprised by the device. Instructions stored on a computer-readable medium that, when executed by a processor that may be comprised by the device, cause the device to execute the method, may be accessible to the device and/or may be comprised by the device.

The conveyor belt may be regulatable in order to be operated in a timed manner at a nominal velocity for a first time period and with stoppage of the conveyor belt for a second time period.

The container treatment machine may comprise at least one treatment zone, the temperature of which can be regulatable.

The at least one treatment zone may comprise a supply line for supplying treatment medium.

BRIEF DESCRIPTION OF THE FIGURES

The accompanying figures show, by way of example, aspects and/or exemplary embodiments of the disclosure for better understanding and illustration. In the figures.

DETAILED DESCRIPTION OF FIGURES

Figures 1, 2:
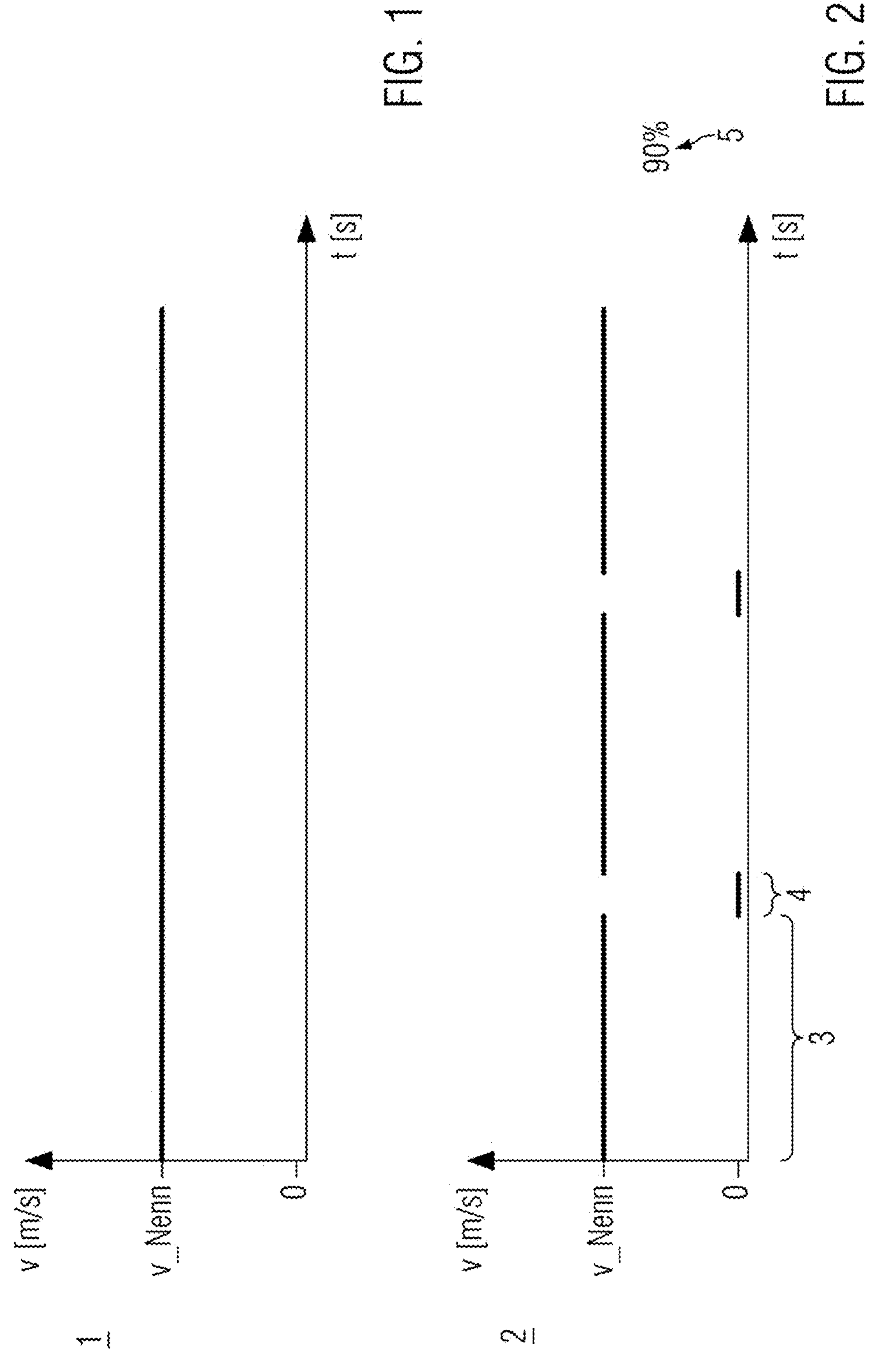
FIG. 1 is a diagram for operating a conveyor belt to reach 100% nominal velocity.
FIG. 2 is a diagram for timed operation of the conveyor belt to reach an effective velocity of 90% nominal velocity.

FIG. 1 shows a diagram 1 for operating a conveyor belt to reach 100% nominal velocity. The velocity v of the conveyor belt in meters per second is shown over the time t in seconds. During the time period shown, the conveyor belt is continuously operated at the nominal velocity v_Nenn.

FIG. 2 shows a diagram 2 for timed operation of the conveyor belt to reach an effective velocity 5 of 90% nominal velocity. The velocity v of the conveyor belt in meters per second is shown over the time t in seconds. During the time period shown, the conveyor belt is operated in a timed manner for a first time period 3 at the nominal velocity v_Nenn and is stopped for a second time period 4. The second time period 4 corresponds to the minimum second time period. The first time period 3 is longer than a minimum first time period. The effective velocity 5 of 90% nominal velocity can be achieved by the cycle times shown.

Figures 3, 4:
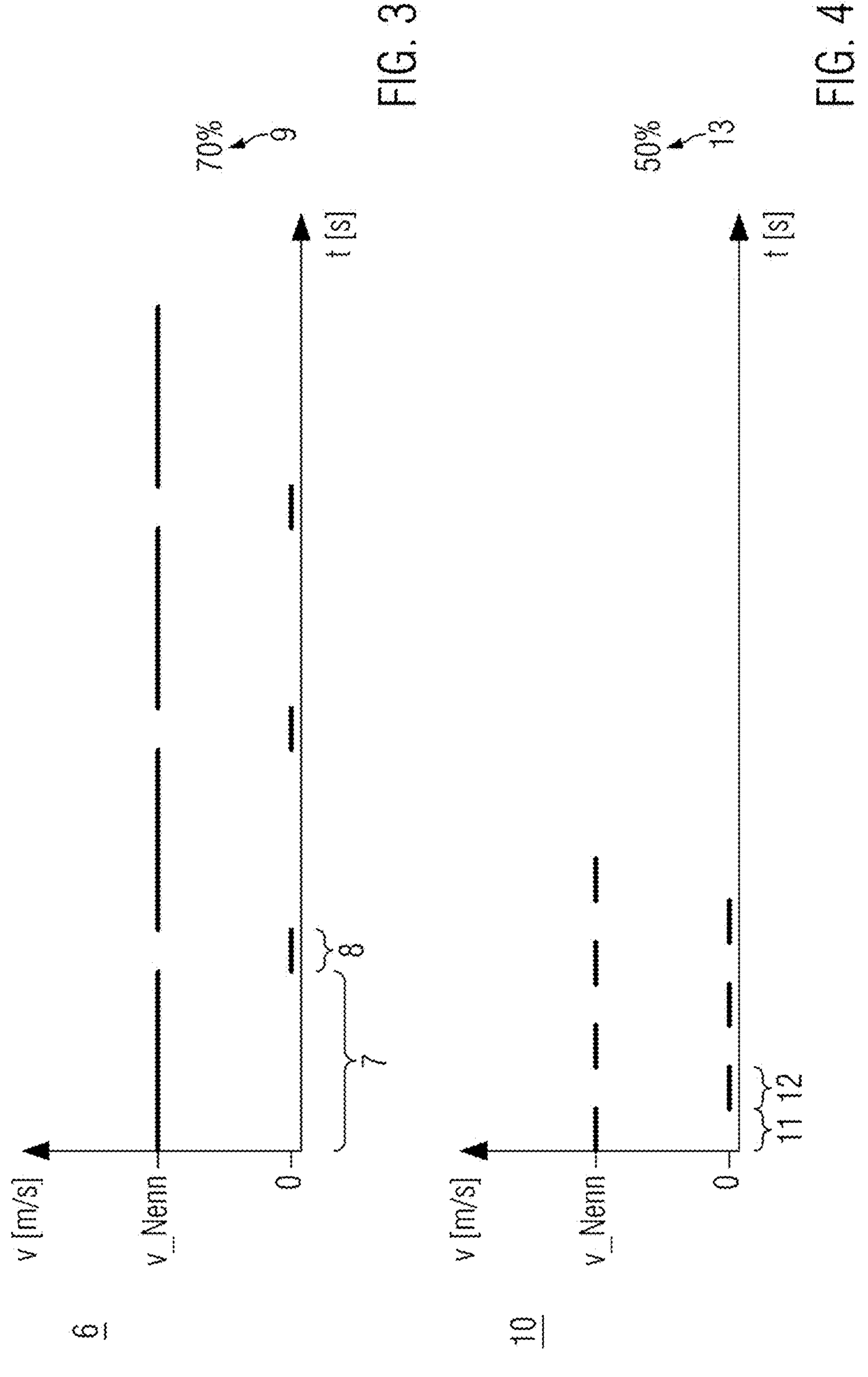
FIG. 3 is a diagram for timed operation of the conveyor belt to reach an effective velocity of 70% nominal velocity.
FIG. 4 is a diagram for timed operation of the conveyor belt to reach an effective velocity of 50% nominal velocity.

FIG. 3 shows a diagram 6 for timed operation of the conveyor belt to reach an effective velocity 9 of 70% nominal velocity. The velocity v of the conveyor belt in meters per second is shown over the time t in seconds. During the time period shown, the conveyor belt is operated in a timed manner for a first time period 7 at the nominal velocity v_Nenn and is stopped for a second time period 8. The second time period 8 corresponds to the minimum second time period. The first time period 7 is longer than the minimum first time period. The first time period 7 of FIG. 3 is also shorter than the first time period of FIG. 2. The effective velocity 9 of 70% nominal velocity can be achieved by the cycle times shown.

FIG. 4 shows a diagram 10 for timed operation of the conveyor belt to reach an effective velocity 13 of 50% nominal velocity. The velocity v of the conveyor belt in meters per second is shown over the time t in seconds. During the time period shown, the conveyor belt is operated in a timed manner for a first time period 11 at the nominal velocity v_Nenn and is stopped for a second time period 12. The first time period 11 corresponds to the minimum first time period, and the second time period 12 corresponds to the minimum second time period. The minimum first time period and the minimum second time period are of equal length in the representation, so that the effective velocity 13 of 50% nominal velocity can be achieved by the cycle times shown.

In order to be able to further reduce the effective velocity (to less than 50% nominal velocity), the minimum first time period is maintained for the first time period, and the second time period is selected to be greater than the minimum second time period.

Figures 5, 6:
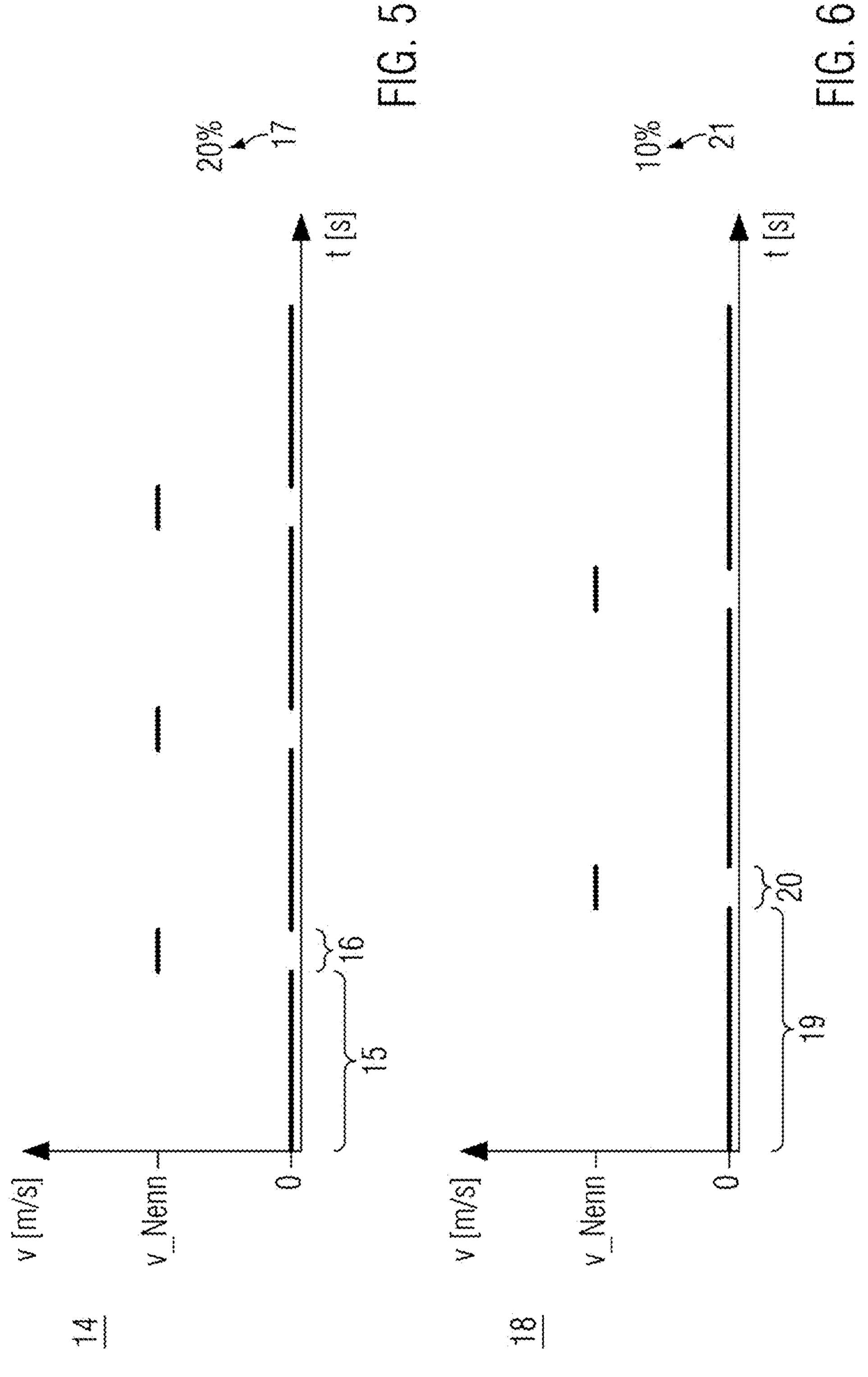
FIG. 5 is a diagram for timed operation of the conveyor belt to reach an effective velocity of 20% nominal velocity.
FIG. 6 is a diagram for timed operation of the conveyor belt to reach an effective velocity of 10% nominal velocity.

FIG. 5 shows a diagram 14 for timed operation of the conveyor belt to reach an effective velocity 17 of 20% nominal velocity. The velocity v of the conveyor belt in meters per second is shown over the time t in seconds. During the time period shown, the conveyor belt is operated in a timed manner for a first time period 16 at the nominal velocity v_Nenn and stopped for a second time period 15. The first time period 16 corresponds to the minimum first time period. The second time period 15 is longer than the minimum second time period. The effective velocity 17 of 20% nominal velocity can be achieved by the cycle times shown.

FIG. 6 shows a diagram 18 for timed operation of the conveyor belt to reach an effective velocity 21 of 10% nominal velocity. The velocity v of the conveyor belt in meters per second is shown over the time t in seconds. During the time period shown, the conveyor belt is operated in a timed manner for a first time period 20 at the nominal velocity v_Nenn and is stopped for a second time period 19. The first time period 20 corresponds to the minimum first time period. The second time period 19 is longer than the minimum second time period. The second time period 19 of FIG. 6 is also longer than the second time period of FIG. 5. The effective velocity 21 of 10% nominal velocity can be achieved by the cycle times shown.

Figure 7:
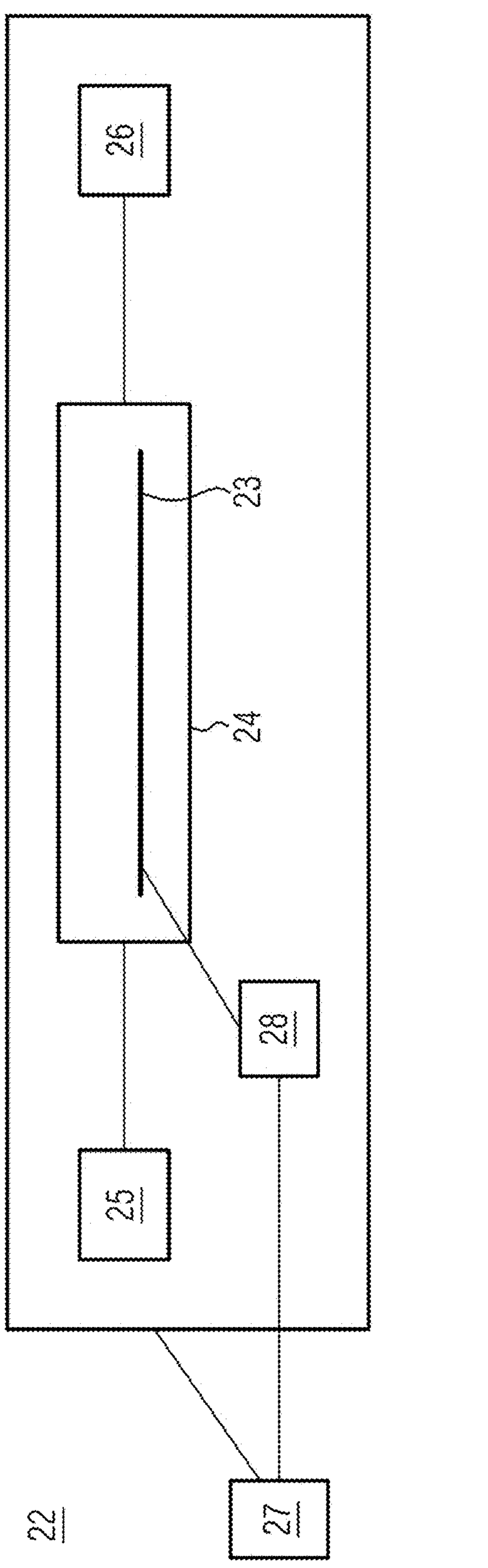
FIG. 7 shows a schematic filling line in which the method may be carried out for regulating a velocity of a conveyor belt of a container treatment machine.

FIG. 7 shows a schematic filling line 22 in which the method for regulating a velocity of a conveyor belt 23 of a container treatment machine 24 may be carried out. The filling line 22 comprises, for example, a first machine 25, which is connected upstream of the container treatment machine 24, and a second machine 26, which is arranged downstream of the container treatment machine 24. The first machine 25 may be a filler for filling product into containers, the container treatment machine 24 may be a pasteurizer for pasteurizing the product filled into the container, and the second machine 26 may be a labeling machine.

A current output of the filling line 22 may be monitored by means of a sensor system 27. When it is determined that the current output falls below a predefined nominal output, the conveyor belt 23 may be operated at an effective velocity by timed operation of the conveyor belt 23 at a nominal velocity for a first time period and with stoppage of the conveyor belt 23 for a second time period. This may be done by means of a regulation device 28 which, for example, can receive and/or access data of the sensor system. The regulation device 28 may comprise instructions stored on a computer-readable medium that, when executed by a processor that may be comprised by the regulation device, cause the regulation device to execute the methods disclosed herein (e.g., cause the regulation device to monitor a current output of the filling line and, when it is determined that the current output falls below a predefined nominal output, operate the conveyor belt at an effective velocity by timed operation of the conveyor belt at a nominal velocity for a first time period and with stoppage of the conveyor belt for a second time period). The instructions may be accessible to the regulation device and/or may be comprised by the regulation device.

For timed operation, for example, cycle times as described in FIGS. 2 to 6 may be used.

The invention claimed is:

1. A method for regulating a velocity of a conveyor belt of a container treatment machine in a filling line having a plurality of machines, wherein the method comprises:

monitoring a current output of the filling line; and when it is determined that the current output falls below a predefined nominal output, operating the conveyor belt at an effective velocity by cycling the conveyor belt between operation at a nominal velocity for a first time period and stoppage of the conveyor belt for a second time period, wherein the first and second time periods are set to achieve the effective velocity.

2. The method according to claim 1, wherein the first time period is equal to a first minimum time period or longer than the first minimum time period.

3. The method according to claim 2, wherein the second time period is equal to a second minimum time period or longer than the second minimum time period.

4. The method according to claim 3, wherein the effective velocity is 50% of the nominal velocity when the first minimum time period and the second minimum time period are equal.

5. The method according to claim 3, wherein, when the first minimum time period is four times as long as the second minimum time period, the effective velocity is 75% of the nominal velocity.

6. The method according to claim 1, wherein the first time period and/or the second time period is equal to or more than 5 seconds, equal to or more than 10 seconds, or equal to or more than 15 seconds.

7. The method according to claim 6, wherein the nominal velocity is 2 meters per second.

8. The method according to claim 1, further comprising lowering a temperature in at least one treatment zone which is comprised by the container treatment machine, wherein the at least one treatment zone is a first and/or a last treatment zone.

9. The method according to claim 8, wherein the temperature is lowered by a supply of treatment medium into the at least one treatment zone.

10. The method according to claim 1, wherein a temperature is lowered in at least one treatment zone, which is comprised by the container treatment machine, based on the effective velocity.

11. A system for a filling line, comprising:

a plurality of machines comprising a container treatment machine, the container treatment machine comprising a conveyor belt;

a sensor system configured to monitor an output of the filling line; and a regulation device comprising a processor and memory storing instructions executable by the processor to:

in response to determination that the output of the filling line is less than a nominal output, operating the conveyor belt at an effective velocity in a timed operation comprising nominal velocity for a first time period and stoppage for a second time period, wherein the timed operation comprises repeated cycling between the nominal velocity and the stoppage, wherein the first time period and the second time period are set to achieve the effective velocity.

12. The system according to claim 11, wherein the conveyor belt is configured to be regulatable in order to be operated in a timed manner at the nominal velocity for the first time period and with stoppage of the conveyor belt for the second time period.

13. The system according to claim 11, wherein the container treatment machine comprises at least one treatment zone, the temperature of which is regulatable.

14. The system according to claim 13, wherein the at least one treatment zone comprises a supply line for supplying treatment medium.

15. The system according to claim 11, wherein the container treatment machine is a pasteurizer.

16. The system according to claim 11, wherein a temperature in at least one treatment zone of the container treatment machine is lowered based on the effective velocity.

17. A method, comprising:

in response to detecting that an output of a container treatment machine is less than a nominal output, operating a conveyor belt of the container treatment machine at an effective velocity by cycling between nominal operation for a first time period and stoppage for a second time period; and lowering a temperature in at least one treatment zone of the container treatment machine based on the effective velocity.

* * * * *